United States Patent
Ely

(10) Patent No.: US 9,680,332 B2
(45) Date of Patent: Jun. 13, 2017

(54) WIRELESS BATTERY CHARGER WITH WIRELESS CONTROL SYSTEM AND METHOD FOR CONTROL THEREOF

(71) Applicant: DELPHI TECHNOLOGIES, INC., Troy, MI (US)

(72) Inventor: Jeffrey A. Ely, Kokomo, IN (US)

(73) Assignee: Delphi Technologies, Inc., Troy, MI (US)

( * ) Notice: Subject to any disclaimer, the term of this patent is extended or adjusted under 35 U.S.C. 154(b) by 194 days.

(21) Appl. No.: 14/700,682

(22) Filed: Apr. 30, 2015

(65) Prior Publication Data
US 2016/0322848 A1 Nov. 3, 2016

(51) Int. Cl.
*H02J 7/02* (2016.01)
*H02J 50/10* (2016.01)
*H02J 50/80* (2016.01)

(52) U.S. Cl.
CPC .............. *H02J 7/025* (2013.01); *H02J 50/10* (2016.02); *H02J 50/80* (2016.02)

(58) Field of Classification Search
CPC ................................. H02J 7/0251; H02J 5/005
See application file for complete search history.

(56) References Cited

U.S. PATENT DOCUMENTS

| | | |
|---|---|---|
| 8,981,728 B1 | 3/2015 | Copelli et al. |
| 2010/0194335 A1 | 8/2010 | Kirby et al. |
| 2012/0007549 A1 | 1/2012 | Murayama et al. |
| 2013/0150993 A1 | 6/2013 | Miyazaki et al. |
| 2013/0285605 A1 | 10/2013 | Partovi |
| 2013/0342024 A1* | 12/2013 | Byun ...................... H02J 5/005 307/104 |
| 2014/0191717 A1 | 7/2014 | Hong et al. |
| 2014/0203774 A1 | 7/2014 | Sawayanagi et al. |
| 2014/0347008 A1 | 11/2014 | Chae et al. |

* cited by examiner

*Primary Examiner* — Drew A Dunn
*Assistant Examiner* — Sailesh Thapa
(74) *Attorney, Agent, or Firm* — Robert J. Myers

(57) ABSTRACT

A wireless electrical charging system and a method of operating same wherein operating parameters from a remote portion of the system are wirelessly transmitted to a charging controller controlling the output voltage of an alternating power supply. The charging controller executes an adaptive model control algorithm that allows the charging controller to update the output voltage at a greater rate than the transmission rate of the operating parameters from the remote portion of the system.

18 Claims, 4 Drawing Sheets

WIRELESS BATTERY CHARGER WITH WIRELESS CONTROL SYSTEM AND METHOD FOR CONTROL THEREOF

TECHNICAL FIELD OF THE INVENTION

The invention relates to a wireless battery charger, particularly to a wireless battery charger with a control system that transmits battery charge data wirelessly from the battery to the charger to control the battery charging process.

BACKGROUND OF THE INVENTION

Wireless electrical power transfer systems, such as those used for wireless charging, are known to incorporate a first coil structure, hereafter referred to as a source coil, that includes a tuned resonant circuit that is configured to convert alternating electrical energy from an electrical power supply to a magnetic field and to transfer the magnetic energy via the magnetic field to a spaced apart second coil structure, hereafter referred to as a capture coil. The capture coil also includes a tuned resonant circuit configured for receiving the magnetic field and converting the magnetic field to electrical energy that is supplied to an electrical load, such as a battery pack or motor. Such a wireless power transfer system may be used for electrically charging an energy storage device, such as the battery pack of an electric or hybrid electric vehicle. In such a system, the source coil may be located on, or embedded into, a surface beneath the vehicle, e.g. the floor of a garage or the surface of a parking lot, and the capture coil may be disposed on the underside of the vehicle.

The current and voltage of the electrical power supplied by the capture coil is determined by the voltage of the electrical power supplied by the power source to the source coil. A control system incorporating feedback of the capture coil voltage and current may be used to control the voltage of the electrical power supplied by the power supply. In order to maintain a wireless connection between the power source and the capture coil, typically the operation of wireless vehicle charging systems has depended primarily on a feedback loop that operates through a wireless communication channel, commonly a wireless channel conforming to Institute of Electrical and Electronics Engineers (IEEE) specification 802.11 (often referred to as "Wi-Fi"). The wireless communication results in a "sampling" effect in the data feedback. The wireless channel also introduces highly variable delays (beyond that of the sampling) and packet losses that require retransmission of the data (another source of delay). The effects of this delay (and its destabilizing effect on the control loop) restricts the possible control bandwidth for the closed-loop control. The control system then does not respond quickly enough to disturbances in the system to ensure reliable operation.

The subject matter discussed in the background section should not be assumed to be prior art merely as a result of its mention in the background section. Similarly, a problem mentioned in the background section or associated with the subject matter of the background section should not be assumed to have been previously recognized in the prior art. The subject matter in the background section merely represents different approaches, which in and of themselves may also be inventions.

BRIEF SUMMARY OF THE INVENTION

In accordance with an embodiment of the invention, an electrical charging system configured to wirelessly charge an energy storage device is provided. The electrical charging system includes an electrical power supply configured to provide electrical power having an alternating output current and an alternating output voltage at a desired frequency. The system also includes an output current sensor configured to determine an output current value ($i_o$) based on the output current and an output voltage sensor configured to determine an output voltage value ($v_o$) based on the output voltage. The system further includes a source coil that is in electrical communication with the electrical power supply and configured to generate an alternating magnetic field. The source coil is magnetically coupled to a capture coil exposed to the alternating magnetic field, thereby inducing the capture coil to capture electrical power from the magnetic field. A rectifier is electrically coupled to the capture coil and the battery and configured to rectify the captured electrical power from the capture coil to a direct current (DC) having a direct, or constant, voltage. The system additionally includes a battery controller that is configured to determine a current command value ($i_c$) representing a desired direct current to be supplied by the rectifier to the battery. The system also includes a direct current sensor that is configured to determine a direct current value ($i_d$) based on the direct current and a direct voltage sensor that is configured to determine a direct voltage value ($v_d$) based on the direct voltage. A transmitter included in the system is configured to transmit a sampled current command value ($i_{cs}$), a sampled direct voltage value ($v_{ds}$), and a sampled direct current value ($i_{ds}$) wirelessly to a receiver at a transmission rate. The sampled current command value ($i_{cs}$), the sampled direct voltage value ($v_{ds}$), and direct current value ($i_{ds}$) are sampled from the current command value ($i_c$), direct voltage value ($v_d$), and the direct current value ($i_d$) respectively. The system additionally includes a charging controller that is in electrical communication with the receiver and the electrical power supply. The charging controller is configured to determine a voltage command value ($v_c$) based on the output current value ($i_o$), the output voltage value ($v_o$), the sampled current command value ($i_{cs}$), the sampled direct voltage value ($v_{ds}$), and the sampled direct current value ($i_{ds}$). The electrical power supply is configured to adjust the output voltage value ($v_o$) based on the voltage command value ($v_c$) determined by the charging controller. A rate at which the voltage command value ($v_c$) is determined by the charging controller is greater than the transmission rate of the transmitter.

According to one particular embodiment, the charging controller determines the voltage command value ($v_c$) based on a difference between the sampled current command value ($i_{cs}$) and a predicted current value ($i_p$) according to the Laplace transform formula: $v_c=(i_{cs}-i_p)*(K_{P2}+K_{I2}/S)$. The values of $K_{P1}$ and $K_{P2}$ are proportional constants and the values of $K_{I1}$ and $K_{I2}$ are integral constants. The predicted current value ($i_p$) is determined according to an adaptive model formula: $i_p=((K_1*v_o*i_o)-K_0)/v_{ds}$. In this exemplary embodiment value of $K_0$ is a constant. The value of $K_1$ is determined according to the Laplace transform formula: $K_1=(i_{ds}-i_p)*(K_{P1}+K_{I1}/S)$. The value of $K_{P1}$ may be zero.

According to this exemplary embodiment, the voltage command value is determined by the charging controller at least once every 20 milliseconds and the transmission rate is about once every 100 milliseconds. The predicted current value is determined by the charging controller no more than once every 100 milliseconds.

The sampled current command value, the sampled direct voltage value, and the sampled direct current value may be transmitted periodically by the transmitter at the transmission rate. The transmission of the sampled current command value, the sampled direct voltage value, and the sampled direct current value may be time delayed by the transmitter.

In accordance with another embodiment, a method of operating an electrical charging system configured to wirelessly charge an energy storage device is provided. The electrical charging system has an electrical power supply that is configured to provide electrical power having an alternating output current and an alternating output voltage at a desired frequency. The system includes a source coil in electrical communication with the electrical power supply and configured to generate an alternating magnetic field and a capture coil configured to be magnetically coupled to said source coil, thereby inducing the capture coil to capture electrical power. This system further includes a rectifier electrically coupled to the capture coil and the battery and configured to provide captured electrical power having a direct voltage and a direct current. This system also has a charging controller that is in electrical communication with the electrical power supply and is configured to adjust the alternating output voltage. The method includes the step of providing an output current sensor configured to determine an output current value based on the output current and providing an output voltage sensor configured to determine an output voltage value based on the output voltage. The method also includes the steps of providing a battery controller configured to determine a current command value and providing a direct current sensor configured to determine a direct current value based on the direct current, and providing a direct voltage sensor configured to determine a direct voltage value based on the direct voltage. The method further includes the step of sampling the current command value, direct voltage value, and the direct current value, providing a transmitter configured to transmit a sampled current command value, a sampled direct voltage value, and a sampled direct current value at a transmission rate and providing a receiver configured to wirelessly receive the sampled current command value, the sampled direct voltage value, and the sampled direct current value from the transmitter. The method additionally includes the step of determining a voltage command value, via the charging controller, based on the output current value, the output voltage value, the sampled current command value, the sampled direct voltage value, and the sampled direct current value. A rate at which the voltage command value is determined by the charging controller is greater than the transmission rate of the transmitter. The method further includes the step of adjusting the output voltage value of the electrical power supply based on the voltage command value.

BRIEF DESCRIPTION OF THE SEVERAL VIEWS OF THE DRAWING

The present invention will now be described, by way of example with reference to the accompanying drawings, in which.

DETAILED DESCRIPTION OF THE INVENTION

The wireless electrical power transfer system presented herein incorporates an adaptive model in the feedback loop to help predict the current that will be supplied by the capture coil to the electrical load and adjust the output voltage of the electrical power supplied by the electrical power supply accordingly. This allows the control bandwidth for the closed-loop control to be increased. For example, the output voltage for the power supply could be adjusted every 20 milliseconds while the capture coil current and voltage data may be updated every 100 milliseconds.

Figure 1:
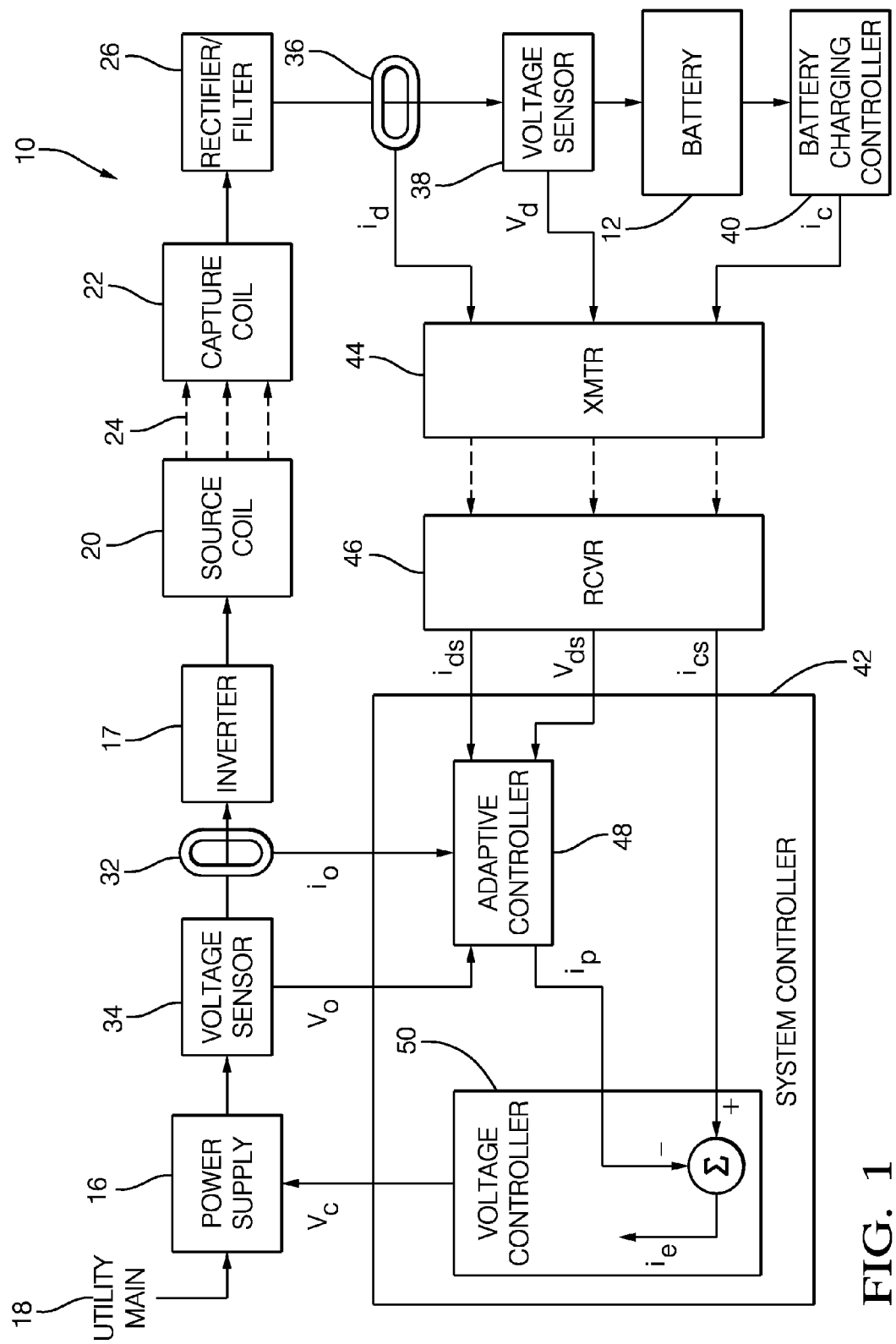
FIG. 1 is a schematic diagram of a wireless electrical power transfer system according to one embodiment.

FIG. 1 illustrates a non-limiting example of a wireless electrical power transfer system 10, hereinafter referred to as the system 10. In this example, the system 10 serves as an electrical charging system configured to wirelessly charge an energy storage device, such as a battery 12 in an electric or hybrid electric vehicle 14.

The system 10 includes an electrical power supply 16 connected to an electrical power source 18, in this example a utility main providing electrical power to the power supply 16 at 240 VAC at 50-60 Hz. The power supply 16 supplies a direct current (DC) voltage to an inverter 17 that produces an alternating current (AC) voltage within a frequency range of 10 kilohertz (kHz) to 450 kHz to provide magnetic coupling between a source coil 20 and a capture coil 22. The output voltage ($v_o$) of the power supply 16 can be adjusted based on an input signal from an external device, such as a controller. In some applications, the frequency of the electrical power output from the power supply 16 may also be controlled to improve magnetic coupling between the source and capture coils 20, 22.

Figure 2:
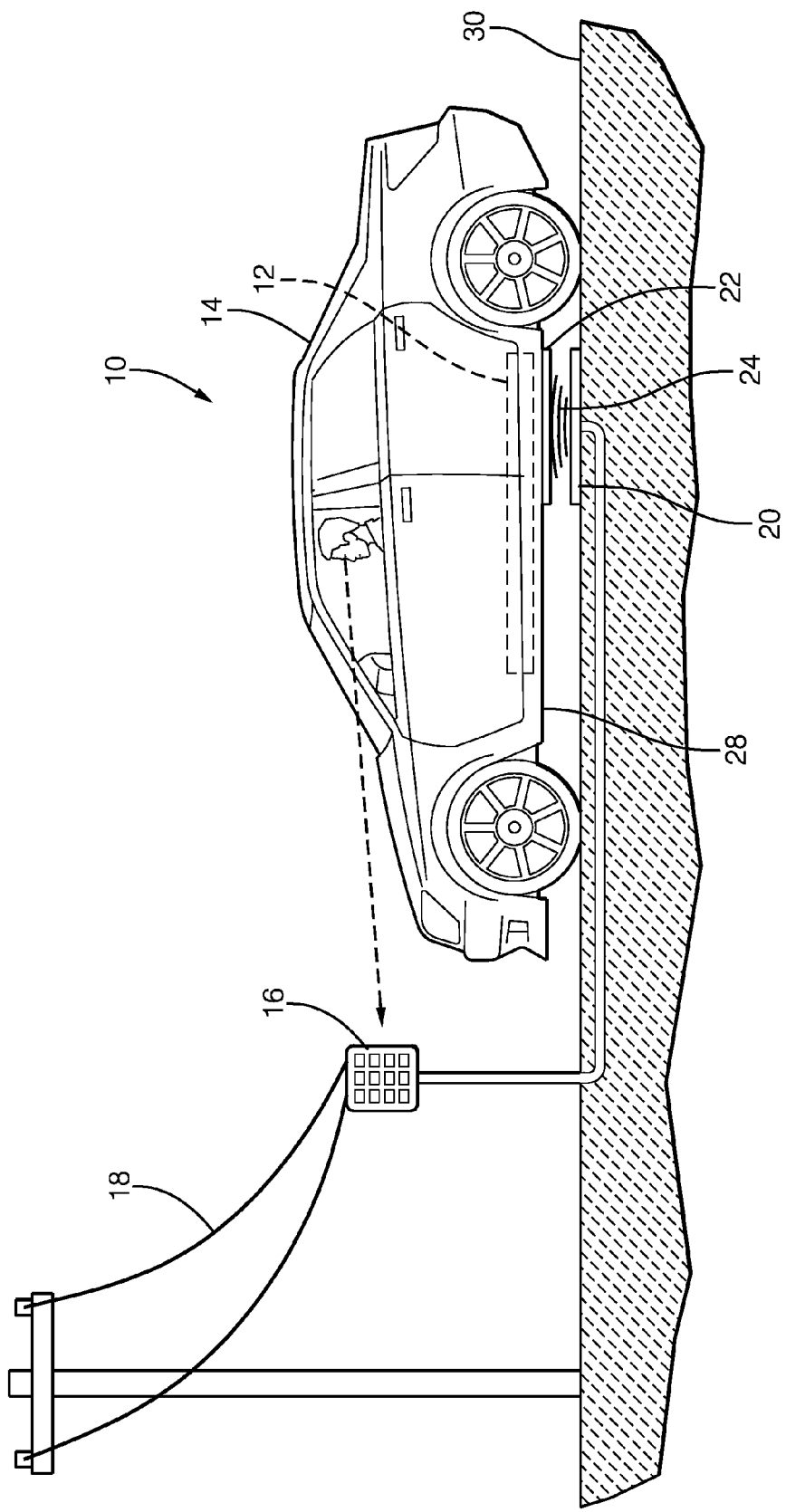
FIG. 2 is pictorial side view of the wirelesses power transfer system of FIG. 1 according to one embodiment.

The power supply 16 is electrically connected to the power source 18. As used herein, electrically connected means that the power supply 16 is connected to the power source 18, e.g. a utility main, by a wire conductor. The alternating electrical power supplied to the source coil 20 by the power supply 16 cause the source coil 20 to generate a magnetic field 24. The capture coil 22 is placed within this magnetic field 24 and the magnetic field 24 induces an alternating electrical current in the capture coil 22, thus converting the magnetic energy in the magnetic field 24 to electrical energy. In order to supply the electrical power captured by the capture coil 22 to the battery 12, the system 10 includes a rectifier 26 and filter 26 to convert the alternating current from the capture coil 22 to a non-time variant current and voltage, hereinafter referred to as a direct current and a direct voltage, that can be used to charge the battery 12. As illustrated in FIG. 2, the capture coil 22 is located on the underside 28 of the vehicle 14 and the source coil 20 is located on a surface 30, such as a parking lot or garage floor, under and apart from the vehicle 14.

Returning now to FIG. 1, the system 10 includes a number of voltage and current sensors. One pair of sensors include an output current sensor 32 that is configured to determine an output current value ($i_o$) based on the output current of the power supply 16 and an output voltage sensor 34 that is configured to determine an output voltage value ($v_o$) based on the output voltage of the power supply 16. The output current sensor 32 and the output voltage sensor 34 together measure the DC electrical power supplied to the inverter 17 and that predicts the power that actually goes to the battery 12. Measuring the "real power" of the alternating voltage output by the inverter 17 AC is very difficult because there is both real power and reactive power (energy that is circulating in the source/capture coil system 20, 22) which would need to be determined. Measuring the DC power supplied to the inverter 17 is much easier and more accurate. So the output voltage value ($v_o$) and the output current value ($i_o$) are DC values and the power supplied to the inverter 17 is the product of the output voltage value ($v_o$) and the output current value ($i_o$) (where the output voltage value ($v_o$) will remain pretty constant and the output current value ($i_o$) can then just be an average).

Another pair of sensors include a direct current sensor 36 that is configured to determine a direct current value ($i_d$) based on the direct current that is output by the rectifier 26 and a direct voltage sensor 38 that is configured to determine a direct voltage value ($v_d$) based on the direct voltage that is output by the rectifier 26. The design, construction, and implementation of these current and voltage sensors are well known to those skilled in the art.

As shown in FIG. 1, the system 10 also includes a pair of controllers. A battery controller 40 is disposed within the vehicle 14 and is electrically connected to the battery 12 and monitors the battery voltage and determines a current command value ($i_c$) based on the current that needs to be supplied by the rectifier 26 in order to efficiently charge the battery 12. The battery controller 40 includes a central processing unit (not shown) that may be a microprocessor, application specific integrated circuit (ASIC), or built from discrete logic and timing circuits (not shown). Software instructions that program the battery controller 40 may be stored in a non-volatile (NV) memory device (not shown). The NV memory device may be contained within the microprocessor or ASIC or it may be a separate device. Non-limiting examples of the types of NV memory that may be used include electrically erasable programmable read only memory (EEPROM), masked read only memory (ROM), and flash memory. The battery controller 40 also includes a wired transceiver (not shown), such as a controller area network (CAN) transceiver, to allow the battery controller 40 to establish electrical communication with other devices within the vehicle 14.

The other controller is a charging controller 42 that is in electrical communication with the power supply 16 and is configured to determine a voltage command value ($v_c$) based on the output current value ($i_o$), the output voltage value ($v_o$), the current command value ($i_c$), the direct voltage value ($v_d$), and the direct current value ($i_d$). The power supply 16 is configured to adjust the output voltage value ($v_o$) based on the voltage command value ($v_c$).

The charging controller 42 includes a central processing unit (not shown) that may be a microprocessor, application specific integrated circuit (ASIC), or built from discrete logic and timing circuits (not shown). Software instructions that program the charging controller 42 to determine the voltage command value ($v_c$) may be stored in a non-volatile (NV) memory device (not shown). The NV memory device may be contained within the microprocessor or ASIC or it may be a separate device. Non-limiting examples of the types of NV memory that may be used include electrically erasable programmable read only memory (EEPROM), masked read only memory (ROM), and flash memory. The charging controller 42 also includes a wired transceiver (not shown), such as a controller area network (CAN) transceiver, to allow the charging controller 42 to establish electrical communication with the power supply 16 and other devices. The voltage command value ($v_c$) may be digitally transmitted from the charging controller 42 to the power supply 16. Alternatively, an analog voltage representing the voltage command value ($v_c$) may be generated by the charging controller 42 and transmitted to the power supply 16.

FIGS. 1 and 2 show that the system 10 further includes a transmitter 44 that is disposed within the vehicle 14 and a receiver 46 located remotely from the vehicle 14 that is wirelessly connected to the transmitter 44 The transmitter 44 includes a wired transceiver (not shown), such as a controller area network (CAN) transceiver, to allow the transmitter 44 to establish electrical communication with the battery controller 40. The transmitter 44 is also in electrical communication with the direct current sensor 36 and is configured to receive the direct current value ($i_d$) from the direct current sensor 36. The transmitter 44 is further in electrical communication with the direct voltage sensor 38 and is configured to receive the direct voltage value ($v_d$) from the direct voltage sensor 38. Similarly, the receiver 46 contains a wired transceiver (not shown), such as a controller area network (CAN) transceiver, to allow the transmitter 44 to establish electrical communication with the charging controller 42.

The transmitter 44 is configured to periodically transmit the current command value ($i_{cs}$) from the battery controller 40, the direct voltage value ($v_{ds}$) from the direct voltage sensor 38, and the direct current value ($i_{ds}$) from the direct current sensor 36. As used herein, "periodically transmitted" may mean either transmitted at regular time intervals or transmitted at irregular time intervals. The periodic transmission creates a sampled current command value ($i_{cs}$), a sampled direct voltage value ($v_{ds}$), and a sampled direct current value ($i_{ds}$) that is received by the receiver 46. Each of these sampled values are then directed from the receiver 46 to the charging controller 42 via the transceivers interconnecting them. The transmission rate is the number of times that the values ($i_{cs}$, $v_{ds}$, $i_{ds}$) are sent from the transmitter 44 to the receiver 46 per a time unit, e.g. 10/sec in the case where the values are sent every 100 milliseconds. This may be an averaged rate when the values are transmitted at irregular time intervals.

The voltage command value ($v_c$) is adjusted to control the direct current value ($i_d$) of the current supplied to the battery 12. The state of charge of the battery 12 is a prime determinant of the direct voltage value ($v_d$). Increasing the output voltage value ($v_o$) of the power supplied to the inverter 17 causes more current to flow into the battery 12. Therefore the system 10 is basically controlling the voltage command value ($v_c$) in order to regulate the direct current value ($i_d$). Without subscribing to any particular theory of operation, this works because the source/capture coil system 20, 22 has a fairly high impedance (actually a reactance). Therefore, the output impedance to the battery 12 is not really low as is typical in a power supply. There is a lot of voltage "droop" as more current ($i_d$) is drawn from the rectifier/filter 26 by the battery 14.

According to an exemplary embodiment, the sampled current command value ($i_{cs}$), the sampled direct voltage value ($v_{ds}$), and the sampled direct current value ($i_{ds}$) are sent from the transmitter 44 to the receiver 46 no more than once every 100 milliseconds. The charging controller 42 calculates the voltage command value ($v_c$) based on the following formula: $v_c = i_e * (K_{P2} + K_{I2}/S)$ written as a Laplace transform where the value of the current error ($i_e$) is a difference between the sampled current command value ($i_{cs}$) and a predicted current value ($i_p$). Calculation of the voltage command value ($v_c$) may be implemented by use of a proportional-integral (PI) controller. The value of $i_e$ is scaled by a proportional scaling factor $K_{P2}$ and added to the integral of $i_e$ scaled by an integral scaling factor $K_{I2}$ to determine the voltage command value. In this exemplary embodiment, the charging controller 42 calculates the voltage command value 50/sec or every 20 milliseconds and sends a command containing the voltage command value to the power supply 16 to adjust the output voltage value ($v_o$). The values for $K_{P2}$ and $K_{I2}$ may be based on the response time of the power supply 16 and the efficiency of the power transfer between the source coil 20 and the capture coil 22 and may be determined experimentally. In this exemplary embodiment, the value of $K_{P2}$ is zero.

The predicted current value ($i_p$) is also calculated by the charging controller 42 and is based on the following adaptive model formula: $i_p=((K_1*v_o*i_o)-K_0)/v_{ds}$, where $v_o$ is the output voltage value of the power supply 16 determined by the output voltage sensor 34, $i_o$ is the output current value of the power supply 16 determined by the output current sensor 32, and $v_{ds}$ is the sampled direct voltage value ($v_{ds}$) sent to the receiver 46 by the transmitter 44. The value of $K_0$ is a constant offset value that is the primary adaptation correction term at low power operation. $K_1$ that is the primary adaptation correction term at high power operation. $K_1$ calculated by the charging controller 42 based on the formula: $K_1=(i_{ds}-i_{p-1})*(K_{P1}+K_{I1}/S)$ written as a Laplace transform, where the difference between $i_{ds}$, the sampled direct current value sent to the receiver 46 by the transmitter 44 and the previously calculated value of the predicted current value ($i_{p-1}$) is scaled by a proportional scaling factor $K_{P1}$ and is added to this difference between $i_{ds}$ and $i_{p-1}$ scaled by an integral scaling factor $K_{I1}$. Calculation of the value of $K_1$ may be implemented by use of a proportional-integral (PI) controller. In this exemplary embodiment, the charging controller 42 calculates the predicted current value and the scaling factor $K_1$ 10/sec or every 100 milliseconds.

A non-limiting example of a start-up sequence for the charging controller 42 of the system 10 is as follows:

Set the integrators used to calculate the voltage command value ($v_c$) and the scaling factor $K_1$ in a hold mode and initialize to typical start-up values.

Initialize the voltage command value ($v_c$) to adjust the output voltage value ($v_o$) to a low start-up value.

Ramp up the voltage command value ($v_c$) to cause the predicted current value ($i_p$) to equal the current command value ($i_c$) via overriding the integrator when calculating the voltage command value ($v_c$). This may be accomplished by overriding the current command value ($i_c$).

Enable the integrator used to calculate the voltage command value ($v_c$), thus establishing a "local" voltage controller 48, i.e. not reliant on values transmitted from the remote battery controller 40, or direct current sensor 36 and direct voltage sensor 38.

Enable the integrator used to calculate the value of $K_1$, thus establishing an adaptive controller 50.

Accordingly, the system 10 provides a "high bandwidth" voltage controller 48 on the source coil 20 side of the system 10, so called because the voltage command value ($v_c$) is calculated once every 20 milliseconds. The power output of the power supply 16 is used as the primary predictor of the capture coil 22 output power and is regulated on the source coil 20 side of the system 10. The system 10 further provides a "low bandwidth" adaptive controller 50 that operates across the wireless link, so called because the predicted current value ($i_p$) and the value of scaling factor $K_1$ are calculated once every 100 milliseconds and is limited by the transmission rate of the wireless link, also about once every 100 milliseconds. The slower predictive changes to the value of scaling factor $K_1$ reduce long term error in the predicted current value ($i_p$). Without subscribing to any particular theory of operation, the system 10 is tolerant of the sampled current command value ($i_{cs}$), the sampled direct voltage value ($v_{ds}$), and the sampled direct current value ($i_{ds}$) and transmission delays across the wireless link due to the lower bandwidth of the adaptive controller 50.

All critical information for controlling the system 10 is available on the receiver side of the wireless link. Proper control of the system 10 requires information from both sides of the wireless link, e.g. output current value ($i_o$), output voltage value ($v_o$) and current command value ($i_c$), direct voltage value ($v_d$), the direct current value ($i_d$). The system 10 ensures a consistent set of control parameters, e.g. the capture coil side is mostly input/output values.

Figure 3:
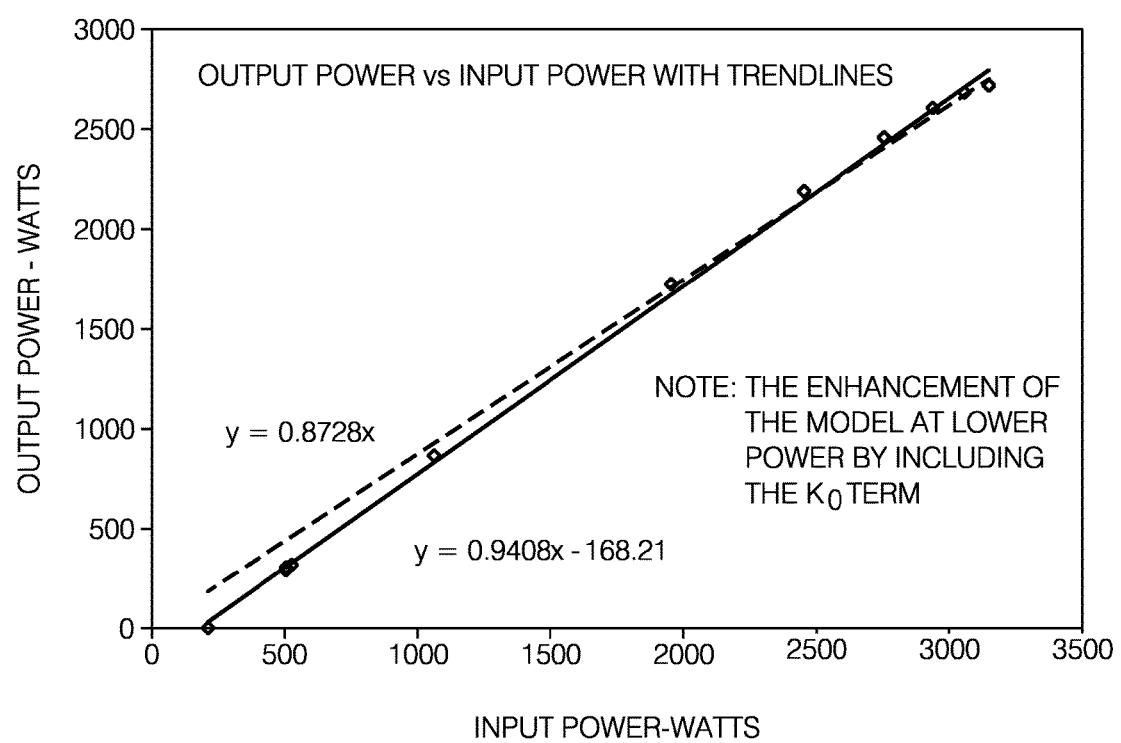
FIG. 3 is graph comparing input power and output power of the wirelesses power transfer system of FIG. 1 using various $K_0$ values according to one embodiment.

FIG. 3 illustrates example comparisons of input power from the power supply to output power from the rectifier/filter to the battery using different values for $K_0$.

Figure 4:
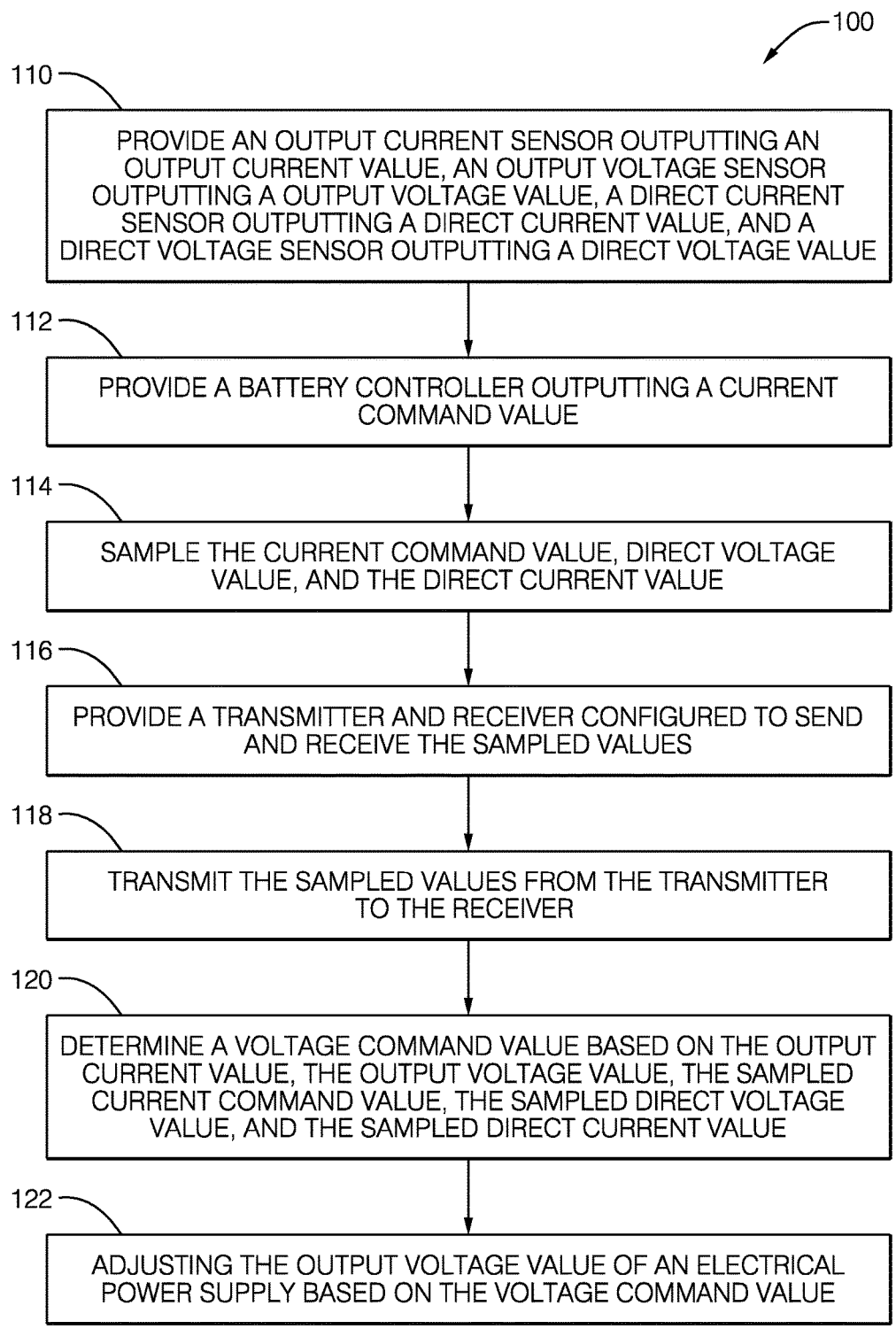
FIG. 4 is a flowchart for a method of controlling a wireless electrical power transfer system according to another embodiment.

FIG. 4 illustrates a non-limiting example of a method 100 of operating an electrical charging system 10 configured to wirelessly charge an energy storage device having an electrical power supply 16 configured to source electrical power having an alternating output current and an alternating output voltage at a desired frequency, a source coil 20 in electrical communication with the power supply 16 and configured to generate an alternating magnetic field 24, a capture coil 22 configured to be magnetically coupled to said source coil 20, thereby inducing the capture coil 22 to capture electrical power, a rectifier 26 electrically coupled to the capture coil 22 and the battery 12 and configured to provide captured electrical power having a direct voltage and a direct current, and a charging controller 42 in electrical communication with the power supply 16 and configured to adjust the alternating output voltage. The method 100 include the following steps.

STEP 110, PROVIDE AN OUTPUT CURRENT SENSOR OUTPUTTING AN OUTPUT CURRENT VALUE, AN OUTPUT VOLTAGE SENSOR OUTPUTTING A OUTPUT VOLTAGE VALUE, A DIRECT CURRENT SENSOR OUTPUTTING A DIRECT CURRENT VALUE, AND A DIRECT VOLTAGE SENSOR OUTPUTTING A DIRECT VOLTAGE VALUE, includes providing an output current sensor 32 configured to determine an output current value ($i_o$) based on the output current, providing an output voltage sensor 34 configured to determine an output voltage value ($v_o$) based on the output voltage, providing a direct current sensor 36 configured to determine a direct current value ($i_d$) based on the direct current, and providing a direct voltage sensor 38 configured to determine a direct voltage value ($v_d$) based on the direct voltage.

STEP 112, PROVIDE A BATTERY CONTROLLER OUTPUTTING A CURRENT COMMAND VALUE, includes providing a battery controller 40 configured to determine a current command value ($i_c$).

STEP 114, SAMPLE THE CURRENT COMMAND VALUE, DIRECT VOLTAGE VALUE, AND THE DIRECT CURRENT VALUE, includes sampling the values of the current command value ($i_c$), direct voltage value ($v_d$), and the direct current value ($i_d$).

STEP 116, PROVIDE A TRANSMITTER AND RECEIVER CONFIGURED TO SEND AND RECEIVE THE SAMPLED VALUES, includes providing a transmitter 44 configured to transmit a sampled current command value ($i_{cs}$), a sampled direct voltage value ($v_{ds}$), and a sampled direct current value ($i_{ds}$) at a transmission rate and providing a receiver 46 configured to wirelessly receive the sampled current command value ($i_{cs}$), the sampled direct voltage value ($v_{ds}$), and the sampled direct current value ($i_{ds}$) from the transmitter 44.

STEP 118, TRANSMIT THE SAMPLED VALUES FROM THE TRANSMITTER TO THE RECEIVER, includes transmitting the sampled current command value ($i_{cs}$), the sampled direct voltage value ($v_{ds}$), and the sampled direct current value ($i_{ds}$) from the transmitter 44 to the receiver 46. The transmission rate is about once every 100 milliseconds. The sampled current command value ($i_{cs}$), the sampled direct voltage value ($v_{ds}$), and the sampled direct current value ($i_{ds}$) are transmitted periodically by the transmitter 44 at the transmission rate. The transmission of the sampled current command value ($i_{cs}$), the sampled direct voltage value ($v_{ds}$), and the sampled direct current value ($i_{ds}$) are time delayed by the transmitter 44.

STEP 120, DETERMINE A VOLTAGE COMMAND VALUE BASED ON THE OUTPUT CURRENT VALUE, THE OUTPUT VOLTAGE VALUE, THE SAMPLED CURRENT COMMAND VALUE, THE SAMPLED DIRECT VOLTAGE VALUE, AND THE SAMPLED DIRECT CURRENT VALUE, includes determining a voltage command value ($v_c$), via the charging controller 42, based on the output current value ($i_o$), the output voltage value ($v_o$), the sampled current command value ($i_{cs}$), the sampled direct voltage value ($v_{ds}$), and the sampled direct current value ($i_{ds}$). A rate at which the voltage command value ($v_c$) is determined by the charging controller 42 is greater than the transmission rate of the transmitter 44. The charging controller 42 determines the voltage command value ($v_c$) based on a difference between the sampled current command value ($i_{cs}$) and a predicted current value ($i_p$) according to the Laplace transform formula: $v_c=(i_{cs}-i_p)*(K_{P2}+K_{I2}/S)$, wherein values of $K_{P1}$ and $K_{P2}$ are proportional constants and values of $K_{I1}$ and $K_{I2}$ are integral constants. The predicted current value ($i_p$) is determined according to an adaptive model formula: $i_p=((K_1*v_o*i_o)-K_0)/v_{ds}$, and wherein a value of $K_0$ is a constant. The value of $K_1$ is determined, via the charging controller 42, according to the Laplace transform formula: $K_1=(i_{ds}-i_{p-1})(K_{P1}+K_{I1}/S)$. The voltage command value ($v_c$) is determined by the charging controller 42 at least once every 20 milliseconds. The predicted current value ($i_p$) is determined by the charging controller 42 no more than once every 100 milliseconds.

STEP 122, ADJUSTING THE OUTPUT VOLTAGE VALUE OF AN ELECTRICAL POWER SUPPLY BASED ON THE VOLTAGE COMMAND VALUE, includes adjusting the output voltage value ($v_p$) of the power supply 16 based on the voltage command value ($v_c$).

Accordingly, wireless electrical charging system 10 and a method 100 of controlling such a system 10 is provided. The system 10 and method 100 provide the advantages of providing a charging controller 42 wirelessly receiving control parameters, e.g. current command, direct voltage and direct current values from a remote portion of the system 10, while adjusting the output voltage of the power supply 16 at a higher rate than the rate at which the control parameters are received wirelessly. This is accomplished by the use an adaptive control model executed by the charging controller 42 that predicts the value current command signal. This system 10 and method 100 can compensate for the sampling and delay of the control parameters from the remote portion of the system 10.

While the examples contained herein have referred to the use of a wireless electrical charging system 10 to charge a battery 12 in an electric vehicle 14 the system 10 and method 100 described herein may be applied to any other wireless power transfer for charging a battery or other energy storage devices, such as wirelessly charging a battery in a portable electronic device, e.g. cellular telephone or tablet computer. In addition, the system 10 is not limited to the calculation rates, transmission rates, and/or particular control formulae listed herein.

While this invention has been described in terms of the preferred embodiments thereof, it is not intended to be so limited, but rather only to the extent set forth in the claims that follow. Moreover, the use of the terms first, second, etc. does not denote any order of importance, but rather the terms first, second, etc. are used to distinguish one element from another. Furthermore, the use of the terms a, an, etc. do not denote a limitation of quantity, but rather denote the presence of at least one of the referenced items.

I claim:

1. An electrical charging system configured to wirelessly charge an energy storage device, comprising:
    an electrical power supply configured to source electrical power having an alternating output current and an alternating output voltage;
    an output current sensor configured to determine an output current value ($i_o$) based on the output current and an output voltage sensor configured to determine an output voltage value ($v_o$) based on the output voltage;
    a source coil in electrical communication with the electrical power supply and configured to generate an alternating magnetic field;
    a capture coil configured to be magnetically coupled to said source coil, thereby inducing the capture coil to capture electrical power;
    a rectifier electrically coupled to the capture coil and the battery and configured to provide captured electrical power having a direct voltage and a direct current;
    a battery controller configured to determine a current command value ($i_c$);
    a direct current sensor configured to determine a direct current value ($i_d$) based on the direct current and a direct voltage sensor configured to determine a direct voltage value ($v_d$) based on the direct voltage;
    a transmitter configured to transmit a sampled current command value ($i_{cs}$), a sampled direct voltage value ($v_{ds}$), and a sampled direct current value ($i_{ds}$) at a transmission rate, wherein the sampled current command value ($i_{cs}$), the sampled direct voltage value ($v_{ds}$), and direct current value ($i_{ds}$) are sampled from the current command value ($i_c$), direct voltage value ($v_d$), and the direct current value ($i_d$) respectively;
    a receiver configured to wirelessly receive the sampled current command value ($i_{cs}$), the sampled direct voltage value ($v_{ds}$), and the sampled direct current value ($i_{ds}$) from the transmitter; and
    a charging controller in electrical communication with the receiver and the electrical power supply and configured to determine a voltage command value ($v_c$) based on the output current value ($i_o$), the output voltage value ($v_o$), the sampled current command value ($i_{cs}$), the sampled direct voltage value ($v_{ds}$), and the sampled direct current value ($i_{ds}$), wherein the electrical power supply is configured to adjust the output voltage value ($v_o$) based on the voltage command value ($v_c$), wherein a rate at which the voltage command value ($v_c$) is determined by the charging controller is greater than the transmission rate of the transmitter, wherein the charging controller determines the voltage command value ($v_c$) based on a difference between the sampled current command value ($i_{cs}$) and a predicted current value ($i_p$) according to the Laplace transform formula: $v_c=(i_{cs}-i_p)*(K_{P2}+K_{I2}/S)$, and wherein values of $K_{P1}$ and $K_{P2}$ are proportional constants and values of $K_{I1}$ and $K_{I2}$ are integral constants.

2. The electrical charging system according to claim 1, wherein the predicted current value ($i_p$) is determined according to an adaptive model formula: $i_p=((K_1*v_o*i_o)-K_0)/v_{ds}$, and wherein a value of $K_0$ is a constant.

3. The electrical charging system according to claim 2, wherein a value of $K_1$ is determined according to the Laplace transform formula: $K_1=(i_{ds}-i_{p-1})*(K_{P1}+K_{I1}/S)$.

4. The electrical charging system according to claim 3, wherein a value of $K_{P1}=0$.

5. The electrical charging system according to claim 1, wherein the voltage command value ($v_c$) is determined by the charging controller at least once every 20 milliseconds.

6. The electrical charging system according to claim 5, wherein the transmission rate is about once every 100 milliseconds.

7. The electrical charging system according to claim 6, wherein the predicted current value ($i_p$) is determined by the charging controller no more than once every 100 milliseconds.

8. The electrical charging system according to claim 1, wherein the sampled current command value ($i_{cs}$), the sampled direct voltage value ($v_{ds}$), and the sampled direct current value ($i_{ds}$) are transmitted periodically by the transmitter at the transmission rate.

9. The electrical charging system according to claim 1, wherein transmission of the sampled current command value ($i_{cs}$), the sampled direct voltage value ($v_{ds}$), and the sampled direct current value ($i_{ds}$) are time delayed by the transmitter.

10. A method of operating an electrical charging system configured to wirelessly charge an energy storage device having an electrical power supply configured to source electrical power having an alternating output current and an alternating output voltage at a desired frequency, a source coil in electrical communication with the electrical power supply and configured to generate an alternating magnetic field, a capture coil configured to be magnetically coupled to said source coil, thereby inducing the capture coil to capture electrical power, a rectifier electrically coupled to the capture coil and the battery and configured to provide captured electrical power having a direct voltage and a direct current, and a charging controller in electrical communication with the electrical power supply and configured to adjust the alternating output voltage, said method comprising the steps of:
providing an output current sensor configured to determine an output current value ($i_o$) based on the output current and providing an output voltage sensor configured to determine an output voltage value ($v_o$) based on the output voltage;
providing a battery controller configured to determine a current command value ($i_c$)
providing a direct current sensor configured to determine a direct current value ($i_d$) based on the direct current and providing a direct voltage sensor configured to determine a direct voltage value ($v_d$) based on the direct voltage;
sampling the values of the current command value ($i_c$), direct voltage value ($v_d$), and the direct current value ($i_d$),
providing a transmitter configured to transmit a sampled current command value ($i_{cs}$), a sampled direct voltage value ($v_{ds}$), and a sampled direct current value ($i_{ds}$) at a transmission rate and providing a receiver configured to wirelessly receive the sampled current command value ($i_{cs}$), the sampled direct voltage value ($v_{ds}$), and the sampled direct current value ($i_{ds}$) from the transmitter;
transmitting the sampled current command value ($i_{cs}$), the sampled direct voltage value ($v_{ds}$), and the sampled direct current value ($i_{ds}$) from the transmitter to the receiver;
determining a voltage command value ($v_c$), via the charging controller, based on the output current value ($i_o$), the output voltage value ($v_o$), the sampled current command value ($i_{cs}$) the sampled direct voltage value ($v_{ds}$), and the sampled direct current value ($i_{ds}$), wherein a rate at which the voltage command value ($v_c$) is determined by the charging controller is greater than the transmission rate of the transmitter; and
adjusting the output voltage value ($v_o$) of the electrical power supply based on the voltage command value ($v_c$) wherein the voltage command value ($v_c$) is determined, via the charging controller, based on a difference between the sampled current command value ($i_{cs}$) and a predicted current value ($i_p$) according to the Laplace transform formula: $v_c=(i_{cs}-i_p)*(K_{P2}+K_{I2}/S)$, wherein values of $K_{P1}$ and $K_{P2}$ are proportional constants and values of $K_{I1}$ and $K_{I2}$ are integral constants.

11. The method according to claim 10, wherein the predicted current value ($i_p$) is determined, via the charging controller, according to an adaptive model formula: $i_p=((K_1*v_o*i_o)-K_0)/v_{ds}$, and wherein a value of $K_0$ is a constant.

12. The method according to claim 11, wherein the value of $K_1$ is determined, via the charging controller, according to the Laplace transform formula: $K_1=(i_{ds}-i_{p-1})*(K_{P1}+K_{I1}/S)$.

13. The method according to claim 12, wherein a value of $K_{P1}=0$.

14. The method according to claim 10, wherein the voltage command value ($v_c$) is determined by the charging controller at least once every 20 milliseconds.

15. The method according to claim 14, wherein the transmission rate is about once every 100 milliseconds.

16. The method according to claim 15, wherein the predicted current value ($i_p$) is determined by the charging controller no more than once every 100 milliseconds.

17. The method according to claim 10, wherein the sampled current command value ($i_{cs}$), the sampled direct voltage value ($v_{ds}$), and the sampled direct current value ($i_{ds}$) are transmitted periodically by the transmitter at the transmission rate.

18. The method according to claim 10, wherein transmission of the sampled current command value ($i_{cs}$), the sampled direct voltage value ($v_{ds}$), and the sampled direct current value ($i_{ds}$) are time delayed by the transmitter.

* * * * *